United States Patent
Xu et al.

(10) Patent No.: US 7,518,844 B1
(45) Date of Patent: Apr. 14, 2009

(54) OVER-VOLTAGE TOLERANT ESD PROTECTION CIRCUIT

(75) Inventors: Feng Xu, Shanghai (CN); Sheng-yuan Zhang, Anhui (CN); Charles Sun, Shanghai (CN)

(73) Assignee: Integrated Device Technology, Inc., San Jose, CA (US)

( * ) Notice: Subject to any disclaimer, the term of this patent is extended or adjusted under 35 U.S.C. 154(b) by 401 days.

(21) Appl. No.: 11/352,496

(22) Filed: Feb. 10, 2006

(51) Int. Cl.
*H02H 9/00* (2006.01)

(52) U.S. Cl. .................... 361/56; 361/91.5; 361/111

(58) Field of Classification Search .................. 361/56, 361/91.1, 91.5, 91.7, 111
See application file for complete search history.

(56) References Cited

U.S. PATENT DOCUMENTS

| | | | | |
|---|---|---|---|---|
| 5,430,595 A | * | 7/1995 | Wagner et al. | 361/56 |
| 5,654,862 A | * | 8/1997 | Worley et al. | 361/111 |
| 6,002,568 A | * | 12/1999 | Ker et al. | 361/111 |
| 6,144,542 A | * | 11/2000 | Ker et al. | 361/111 |
| 6,236,549 B1 | * | 5/2001 | Peleska | 361/91.6 |
| 6,747,501 B2 | * | 6/2004 | Ker et al. | 327/310 |
| 6,765,772 B2 | | 7/2004 | Lee et al. | |
| 6,879,203 B2 | | 4/2005 | Wu et al. | |
| 6,920,026 B2 | | 7/2005 | Chen et al. | |
| 2002/0109191 A1 | * | 8/2002 | Sato et al. | 257/355 |
| 2006/0077601 A1 | * | 4/2006 | Ikeda et al. | 361/56 |

* cited by examiner

*Primary Examiner*—Stephen W Jackson
*Assistant Examiner*—Terrence R Willoughby
(74) *Attorney, Agent, or Firm*—Kenneth Glass; Glass & Associates (57) ABSTRACT

An ESD protection circuit for over-voltage signal bus is disclosed that includes a diode circuit that is electrically connected to a pseudo power supply circuit. The pseudo power supply circuit includes a pseudo first power supply line coupling to an actual first power supply line having a first voltage supply level and a pseudo second power supply line coupling to an actual second power supply line having a second voltage supply level. The pseudo first power supply line and the pseudo second power supply line are clamped by an ESD clamping circuit such that the ESD protection circuit discharges voltage when an ESD event occurs, and does not interfere with the internal circuit when an over-voltage occurs.

17 Claims, 8 Drawing Sheets

OVER-VOLTAGE TOLERANT ESD PROTECTION CIRCUIT

FIELD OF THE INVENTION

The invention relates to integrated circuits. More particularly, this invention relates to electrostatic discharge protection circuits.

BACKGROUND OF THE INVENTION

Electrostatic discharge (ESD) event occurring at the chip level is one of the major causes of integrated circuit failure. To protect integrated circuits from such ESD events, conventional ESD protection circuits that are connected between the input output (I/O) pads and the internal circuits are used to discharge the damaging ESD current to an electrical ground. However, as integrated circuits' size continues to shrink to sub-micron level and the operating speed increases above the gigahertz threshold, higher current densities and lower voltage tolerance are required to reduce noise and power consumption. As a result, it is more difficult to provide ESD protection without affecting the normal operations of these integrated circuits.

Conventional ESD protection circuits often mistake an over-voltage well within the voltage tolerances of the signal bus pads as ESD events, activating a discharge path that draws away current from the internal circuits and thus undermining their performances. For example, the I/O pads of Multi-point Low Voltage Differential Signaling (MLVDS) integrated circuits need to tolerate a voltage from −1.4 V to 3.8 V that is caused by overshoots when the operating power supply levels of the internal circuits are at 0 volts and at 3.3 volts. As the voltage at the I/O pads in MLVDS integrated circuits is lower than 0 Volts in normal operation, diodes in prior art ESD protection circuits can be inadvertently placed in the forward-biased condition and current may flow through these diodes from signal bus pad to electrical ground, thus interfering with normal operation of the internal circuits.

Therefore, there is a need for an ESD protection circuit that can protect integrated circuits from ESD events and that will not discharge at over-voltage events. The present invention meets the above needs.

SUMMARY OF THE INVENTION

An ESD protection circuit is disclosed that includes a diode circuit electrically connected to a pseudo power supply circuit. The pseudo power supply circuit includes a pseudo first power supply line coupling to an actual first power supply line having a first voltage supply level and a pseudo second power supply line coupling to an actual second power supply line having a second voltage supply level. The pseudo first power supply line and the pseudo second power supply line are clamped by an ESD clamping circuit at a fixed third voltage level.

The ESD protection circuit is operable to discharge ESD current that exceeds the normal operating voltage range. However, the ESD protection circuit of the present invention does not discharge when over-voltage exceeding the power supply or lower than ground is received at signal bus pads. Accordingly, the ESD protection circuit of the present invention does not interfere with normal circuit operation when over-voltage exceeding the power supply or lower than ground is received, as long as the voltage is within the normal operating voltage range. Other objects, features and advantages will become apparent upon consideration of the following detailed description, the accompanying drawings and appended claims.

BRIEF DESCRIPTION OF THE DRAWINGS

The accompanying drawings, which are incorporated in and constitute a part of this specification, provide a further understanding of the invention. Among the drawings.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
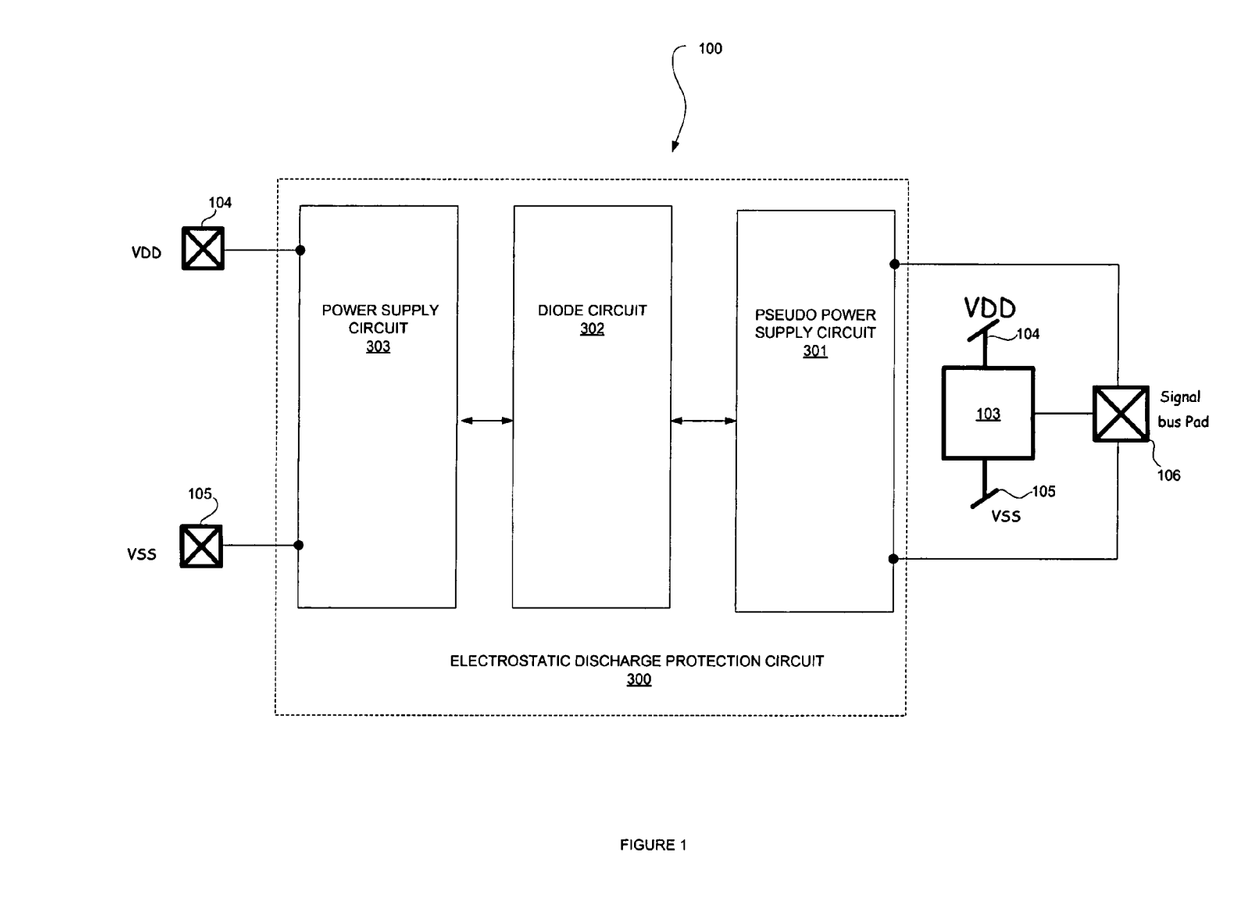
FIG. 1 shows block diagram of an electrostatic discharge protection circuit that is electrically coupled to a signal bus pad and an internal circuit that is to be protected, where the electrostatic discharge protection circuit includes a pseudo power supply circuit, a diode circuit, and an actual power supply circuit in accordance with an embodiment of the present invention.

FIG. 1 shows a block diagram of an integrated circuit 100 that includes an electrostatic discharge protection circuit 300 electrically connected to protect an internal circuit 103 having a signal bus pad 106. Internal circuit 103 is connected to a first power supply pin 104 and to a second power supply pin 105. In the present embodiment, first power supply pin 104 is a positive power supply voltage to integrated circuit 100 and second power supply pin 105 is an electrical ground. In one embodiment, a voltage range from 3.8 volts to −1.4 volts is applied to signal bus pad 106 when first power supply pin 104 is at a positive 3.3 volts and second power supply pin 105 is at a zero volts. Electrostatic discharge protection circuit 300 further includes a pseudo power supply circuit 301 electrically coupled to a diode circuit 302. In one embodiment, electrostatic discharge circuit 300 also includes an actual power supply circuit 303.

In operation, electrostatic discharge protection circuit 300 is operable to provide discharge paths to protect internal circuit 103 from electrostatic discharge events and at the same time electrostatic discharge circuit 300 is operable not to provide discharge paths when an over-voltage event occurs at signal bus pad 106 so that the over-voltage event does not interfere with the normal operations of internal circuit 103. The term over-voltage as used in the present application refers to voltage levels that are greater than the voltage level of first power supply pin ($V_{DD}$) 104 but substantially less than the positive electrostatic discharge voltages and voltage levels less than second power supply pin ($V_{SS}$) but substantially greater than the negative electrostatic discharge voltages. The magnitude of electrostatic discharge voltage ranges from 15,000 volts to 35,000 volts while the magnitude of the over-voltage is substantially less than 500 volts. Electrostatic discharge event is caused by a single-event electrostatic discharge while over-voltage is caused by overshoots and ground bounce that are caused by electromagnetic interference (EMI).

When an electrostatic discharge (ESD) event occurs at signal bus pad 106, pseudo power supply circuit 301 causes diode circuit 302 to conduct and provides discharge paths to protect internal circuit 103 from being permanently damaged by the ESD current. However, when an over-voltage event occurs at signal bus pad 106, pseudo power supply circuit 301 prevents diode circuit 302 from conducting. As a result, discharge paths are not activated and the normal operation of internal circuit 103 is not affected.

More particularly, when electrostatic discharge events occur at signal bus pad 106 and when first power supply pin ($V_{DD}$) 104 is electrically more grounded than signal bus pad 106, pseudo power supply circuit 301 causes diode circuit 302 to conduct and to provide a discharge path from signal bus pad 106 to first power supply ($V_{DD}$) to shunt the ESD current to first power supply ($V_{DD}$) pin 104. Similarly, when electrostatic discharge events occur at signal bus pad 106 and when second power supply ($V_{SS}$) pin 105 is electrically more grounded than signal bus pad 106, electrostatic discharge circuit 301 causes diode circuit 302 to conduct to and to provide a discharge path to shunt the ESD current to second power supply ($V_{SS}$) pin 105. In case an electrostatic discharge event occurs at a first signal bus pad and when another signal bus pad (not shown) is electrically more grounded than the first signal bus pad, electrostatic discharge circuit 301 causes diode circuit 302 to conduct so as to provide a discharge path to shunt the ESD current to the second signal bus pad. However, in each of the above cases, when the voltage received at signal bus pad 106 is an over-voltage, ESD protection circuit 300 prevents diode circuit 302 from conducting so that electrostatic discharge paths are not activated and thus, the normal operation of integrated circuit 103 is not affected.

Figure 2:
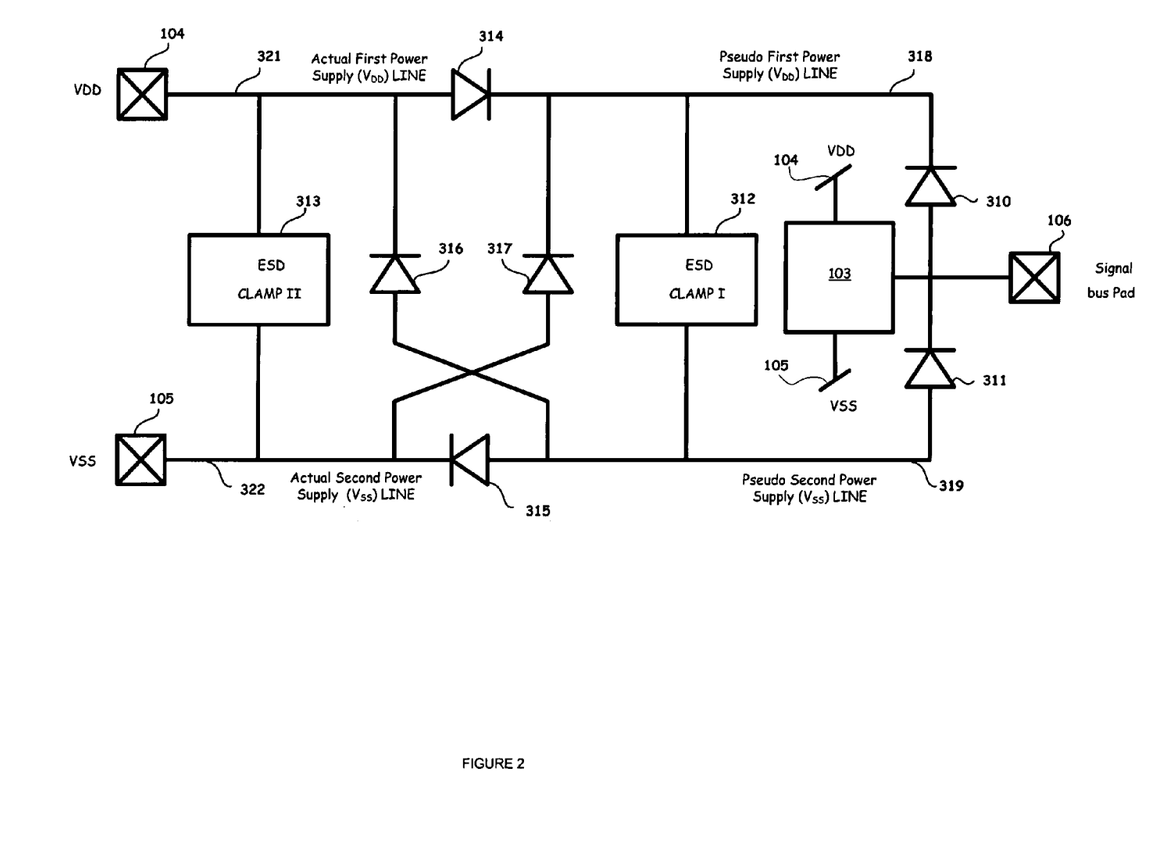
FIG. 2 shows an embodiment in which the electrostatic discharge protection circuit of FIG. 1 includes two voltage clamps and six diodes in accordance with an embodiment of the present invention.

Now referring to FIG. 2, an embodiment is shown in which electrostatic discharge protection circuit 300 includes a pseudo first power supply ($V_{DD}$) line 318, a pseudo second power supply ($V_{SS}$) line 319, an actual first power supply ($V_{DD}$) line 321, an actual second power supply ($V_{SS}$) line 322, six diodes 310, 311, 314, 315, 316 and 317, a first ESD clamping circuit 312, and a second ESD clamping circuit 313. More particularly, Pseudo power supply circuit 301 includes pseudo first power supply ($V_{DD}$) line 318, pseudo second power supply ($V_{SS}$) line 319, and first ESD clamping circuit 312. Diode circuit 302 has diodes 310, 311, 314, 315, 316, and 317. Actual power supply circuit 303 includes first actual power supply ($V_{DD}$) line 321, second power supply ($V_{SS}$) line 322, and second ESD clamping circuit 313.

Referring again to FIG. 2, in pseudo power supply circuit 301 of the present embodiment, diode 310 is connected in series between signal bus pad 106 and pseudo first power supply ($V_{DD}$) line 318. That is, the anode terminal of first diode 310 is connected to signal bus pad 106, and the cathode terminal of diode 310 is electrically connected to pseudo first power supply ($V_{DD}$) line 318. Diode 311 is connected in series between signal bus pad 106 and pseudo second power supply ($V_{SS}$) line 319. That is, the cathode terminal of diode 311 is electrically connected to signal bus pad 106 and the anode terminal is electrically connected to pseudo second power supply ($V_{SS}$) line 319. First ESD clamping circuit 312 is electrically connected to first pseudo power supply ($V_{DD}$) line 318 and to second pseudo power supply ($V_{SS}$) line 319. First ESD clamping circuit 312 maintains a fixed voltage between pseudo first power supply ($V_{DD}$) line 318 and pseudo second power supply line 319.

In diode circuit 302 of the present embodiment, pseudo first power supply ($V_{DD}$) line 318 is coupled between diode 310 and diode 314. The cathode terminal of diode 314 is electrically connected to pseudo first power supply ($V_{DD}$) line 318. The anode terminal of diode 314 is electrically connected to actual first power supply ($V_{DD}$) line 321. Diode 314 couples a first voltage supply ($V_{DD}$) to pseudo first power supply ($V_{DD}$) line 318. Pseudo second power supply ($V_{SS}$) line 319 is coupled between diode 311 and diode 315. The anode terminal of diode 315 is electrically connected to pseudo second power supply ($V_{SS}$) line 319, and the cathode terminal is electrically connected to actual second power supply ($V_{SS}$) line 322. Diode 315 couples a second voltage supply ($V_{SS}$) to pseudo second power supply ($V_{SS}$) line 319. Diode 316 electrically crosses couple actual first power supply ($V_{DD}$) line 321 to pseudo second power supply ($V_{SS}$) line 319. More particularly, cathode terminal of diode 316 is electrically connected to actual first power supply ($V_{DD}$) line 321 and the anode terminal of diode 314. The anode terminal of diode 316 is electrically connected to pseudo second power supply ($V_{SS}$) line 319 and the anode terminal of diode 315. Similarly, the cathode terminal of diode 317 is electrically connected to pseudo first power supply ($V_{DD}$) line 318 and to the cathode terminal of diode 314. The anode terminal of diode 317 is electrically connected to actual second power supply ($V_{SS}$) line 322 and to the cathode terminal of diode 315.

In the present embodiment, actual power supply circuit 303 is electrically connected to diode circuit 302. More particularly, actual first power supply ($V_{DD}$) line 321 is electrically connected to receive first power supply voltage ($V_{DD}$) from a first power supply ($V_{DD}$) pin 104. Actual first power supply ($V_{DD}$) line 321 is also connected to the anode terminal of diode 314 so that pseudo first power supply ($V_{DD}$) line 318 receives first power supply ($V_{DD}$) from actual first power supply ($V_{DD}$) line 321. Actual second power supply ($V_{SS}$) line 322 is electrically connected to receive a second power supply voltage ($V_{SS}$) from a second power supply ($V_{SS}$) pin 105. Actual second power supply ($V_{SS}$) line is also electrically connected to cathode terminal of diode 315 so that pseudo second power supply ($V_{SS}$) line 319 receives second power supply voltage ($V_{SS}$) from actual second power supply ($V_{SS}$) line 322.

An electrostatic discharge (ESD) pulse current applied to signal bus pad 106 is discharged away to either first power supply ($V_{DD}$) pin 104 or second power supply ($V_{SS}$) pin 105. However, ESD protection circuit 300 does not interfere with the normal operation of internal circuit 103 even when there is an over-voltage at signal bus pad 106. The operations of ESD protection circuit 300 and various discharge paths are shown in FIGS. 3-8.

When a positive electrostatic discharge (ESD) stress is applied to signal bus pad 106 with first power supply ($V_{DD}$) pin 104 relatively grounded, the positive ESD pulse elevates the voltage at signal bus pad 106 to a very high ESD voltage. High voltage at the anode terminal of diode 310 turns diode 310 ON. On the other hand, diode 311 is OFF because the high ESD voltage is placed at its cathode terminal. The forward biased diode 310 causes current to flow through it and as a result the voltage on pseudo first power supply ($V_{DD}$) line 318 increases, increasing the voltage gap between pseudo first power supply ($V_{DD}$) line 318 and pseudo second power supply ($V_{SS}$) line 319. In response, first electrostatic discharge (ESD) clamping circuit 312 causes ESD current to flow through it so as to maintain a fixed voltage gap ($V_{clamp1}$) between pseudo first power supply ($V_{DD}$) line 318 and pseudo second power supply ($V_{SS}$) line 319. As a result, the voltage on pseudo second power supply ($V_{SS}$) line 319 increases so that the potential between pseudo first power supply ($V_{DD}$) line 318 and pseudo second power supply ($V_{SS}$) line 319 stay at first fixed voltage ($V_{clamp1}$) set by first ESD clamping circuit 312. As the voltage on pseudo electrical ground ($V_{SS}$) line 319 raises, diode 315 is forward biased and becomes conductive. Consequently, the voltage on actual second power supply ($V_{SS}$) line 322 increases, increasing the voltage gap between actual second power supply ($V_{SS}$) line 322 and actual first power supply ($V_{DD}$) line 321. In response, second ESD clamping circuit 313 causes current to flow from actual second power supply ($V_{SS}$) line 322 to actual first power supply ($V_{DD}$) line 321 in order to clamp the potential between them at a second fixed voltage ($V_{clamp2}$). Because the voltage on pseudo first power supply ($V_{DD}$) line 318 is higher than voltage on actual second power supply ($V_{SS}$) line 322, diode 317 is OFF. Since the voltage on pseudo second power supply ($V_{SS}$) line 319 is higher than the voltage on actual first power supply ($V_{DD}$) line 321, diode 316 is ON. Forward biased diode 316 causes ESD current to flow from pseudo second power supply ($V_{SS}$) line 319 to actual first power supply ($V_{DD}$) line 321. The discharge path is labeled as PD in FIG. 3.

Figure 3:
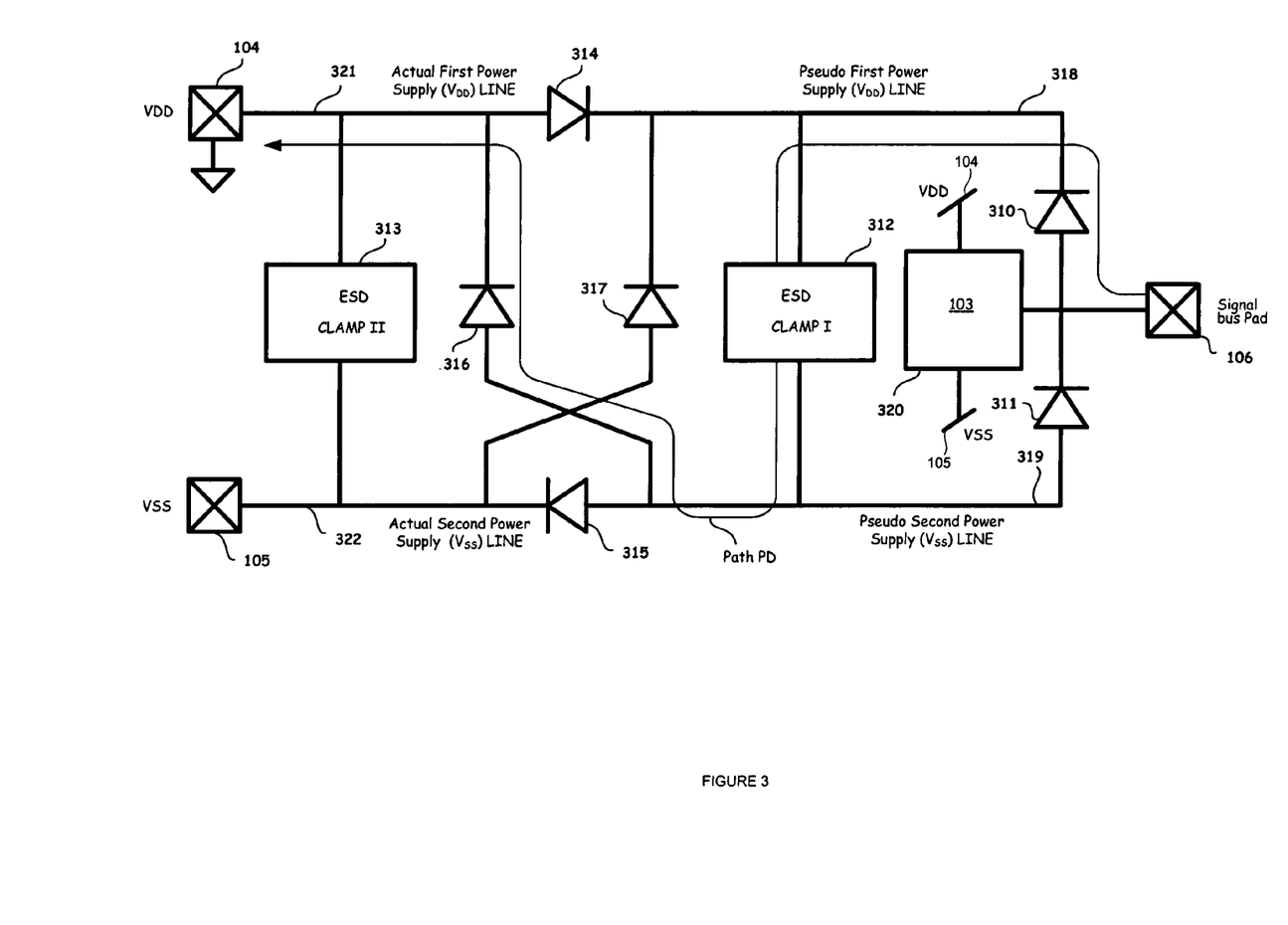
FIG. 3 shows the current discharge paths of the electrostatic discharge circuit of FIG. 2 when a positive ESD pulse is applied to the signal bus pad with the power supply pin ($V_{DD}$) relatively grounded in accordance with an embodiment of the present invention.

Continuing with FIG. 3, during normal operation of IC 100 when a voltage higher than actual first power supply ($V_{DD}$) pin 104 is applied to signal bus pad 106, the over-voltage would turn on diode 310 and leave diode 314 in the OFF state. As such, the bounce on pseudo first power supply ($V_{DD}$) line 318 would not affect actual first power supply ($V_{DD}$) line 321. Thus, the normal operation of internal circuit 103 is not affected by the over-voltage at signal bus pad 106.

Figure 4:
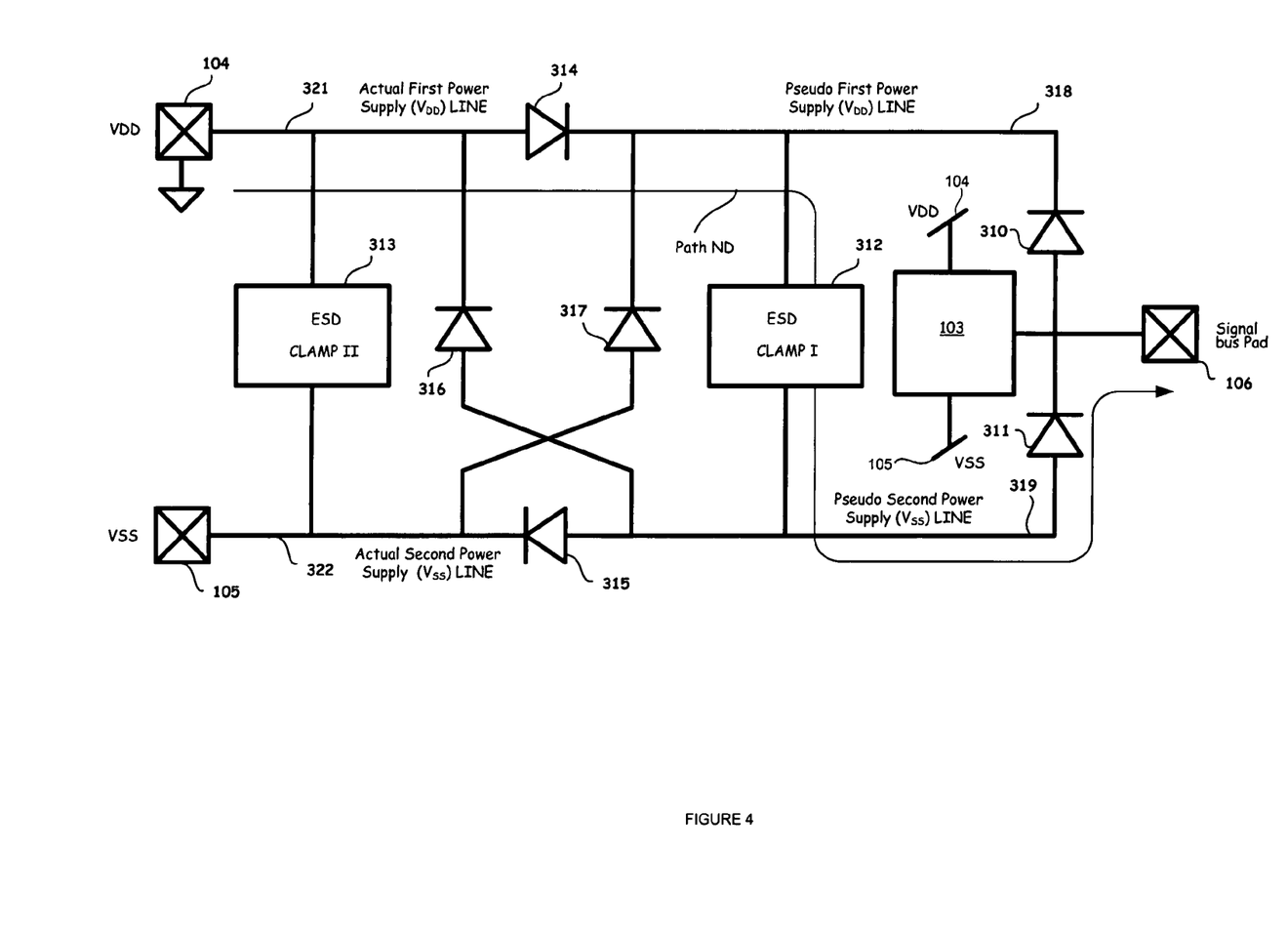
FIG. 4 shows the current discharge paths of the electrostatic discharge circuit of FIG. 2 when a negative ESD pulse is applied to the signal bus pad with the first power supply pin ($V_{DD}$) relatively grounded in accordance with an embodiment of the present invention.

FIG. 4 shows a discharge path when a negative ESD stress is applied to signal bus pad 106 with first power supply ($V_{DD}$) 104 pin relatively grounded. More particularly, when a negative ESD stress occurs at signal bus pad 106, diode 311 is ON and diode 310 is OFF. Diode 311, now placed in forward biased region, causes current to flow from signal bus pad 106 to pseudo second power supply ($V_{SS}$) line 319. Thus, the voltage on pseudo second power supply ($V_{SS}$) line 319 becomes more negative, enlarging the voltage gap between pseudo second power supply ($V_{SS}$) line 319 and pseudo first power supply ($V_{DD}$) line 318. In response, first ESD clamping circuit 312 discharges to maintain the fixed clamping voltage ($V_{clamp1}$). At the same time, diode 315 is OFF because the negative voltage on pseudo second power supply ($V_{SS}$) 319 is present at its anode terminal. The discharging first ESD clamping circuit 312 causes voltage on pseudo first power supply ($V_{DD}$) line to drop, turning ON diode 317 and diode 314. Negative ESD current flows from pseudo first power supply ($V_{DD}$) line 318 to actual first power supply ($V_{DD}$) line 321 via diode 314. Thus, ESD protection circuit 300 causes negative ESD current to flow through diode 311, first ESD clamping circuit 312, diode 314, actual first power supply ($V_{DD}$) line 321, and to first power supply ($V_{DD}$) pin 104. This path is labeled as path ND.

Continuing with FIG. 4, during the normal operation of IC 100 when a negative voltage lower than actual second power supply ($V_{SS}$) pin 105 is applied at signal bus pad 106, the voltage drop across diode 315 is not sufficient to cause it to conduct so that actual second power supply line ($V_{SS}$) 322 is sealed off from the over-voltage by diode 315. Therefore, negative over-voltage at signal bus pad 106 does not interfere with the normal operation of internal circuit 103.

Figure 5:
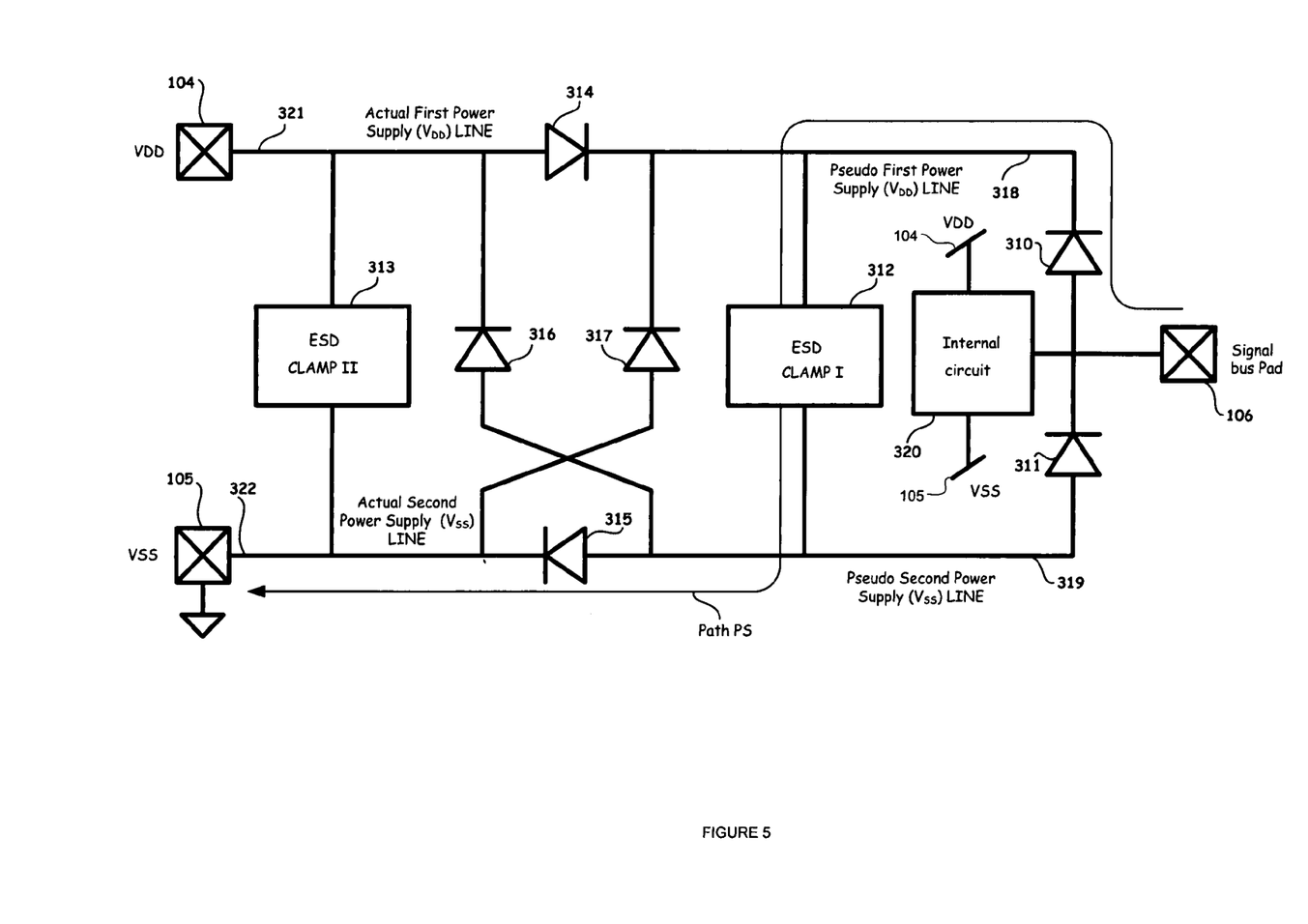
FIG. 5 shows the current discharge paths of the electrostatic discharge circuit of FIG. 2 when a positive ESD pulse is applied to the signal bus pad with the first power supply pin ($V_{DD}$) relatively grounded in accordance with an embodiment of the present invention.
Figure 6:
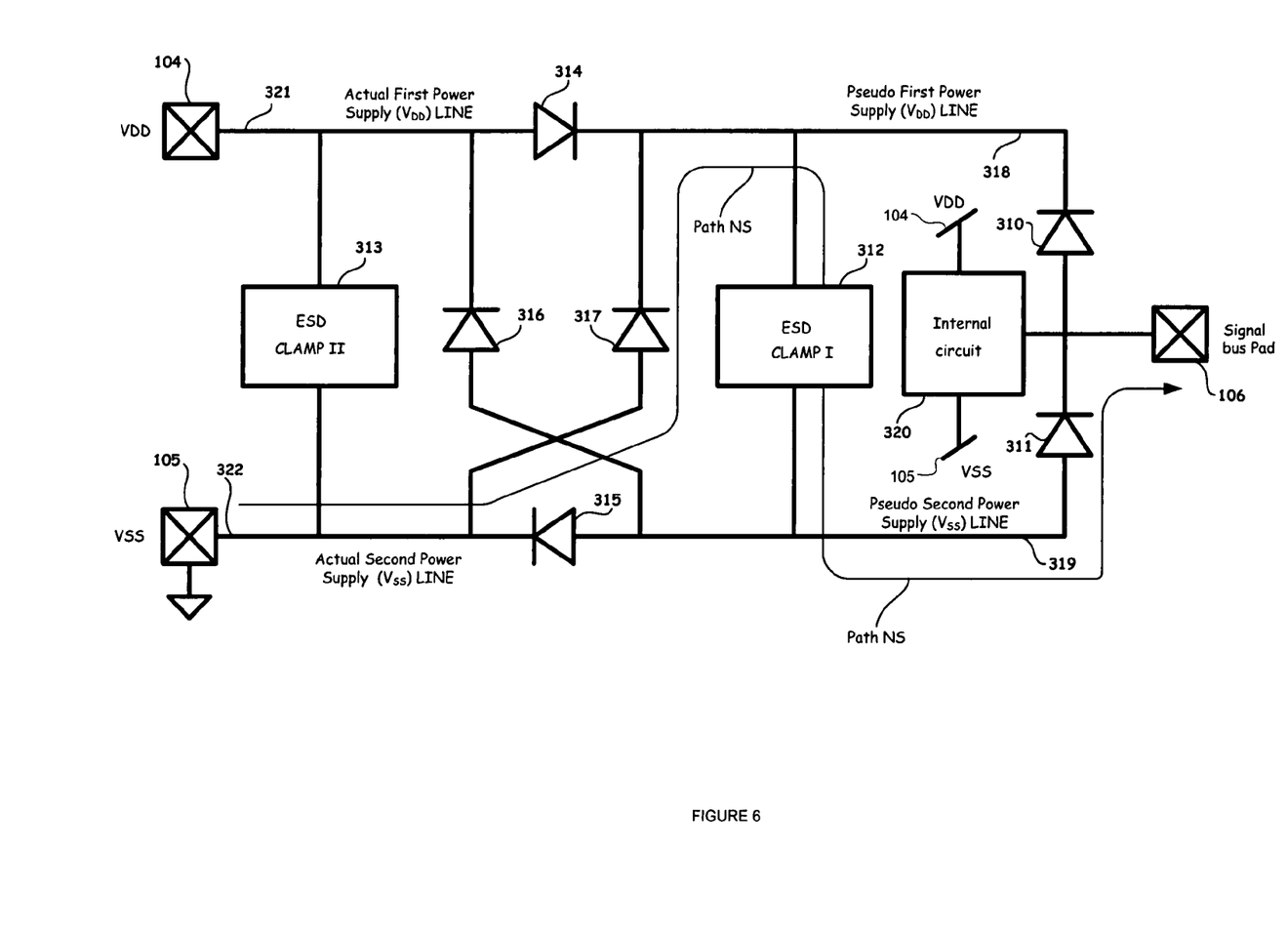
FIG. 6 shows the current discharge paths of the electrostatic discharge circuit of FIG. 2 when a negative ESD pulse is applied to the signal bus pad with the second power supply pin ($V_{SS}$) relatively grounded in accordance with an embodiment of the present invention.

FIG. 5 and FIG. 6 show the electrostatic discharge (ESD) situation where second power supply ($V_{SS}$) pin 105 is relatively more grounded than signal bus pad 106. When second power supply ($V_{SS}$) pin 105 is grounded and a positive ESD pulse is applied to signal bus pad 106, the positive ESD pulse elevates the voltage at signal bus pad 106 to a very high positive ESD voltage. High positive voltage at the anode terminal of diode 310 turns ON diode 310. On the other hand, diode 311 is OFF because the positive ESD voltage is placed at its cathode terminal. The forward biased diode 310 causes current to flow through it and as a result the voltage on pseudo first power supply ($V_{DD}$) line 318 becomes high, increasing the voltage gap between pseudo first power supply ($V_{DD}$) line 318 and pseudo second power supply ($V_{SS}$) line 319. In response, first electrostatic discharge (ESD) clamping device 312 causes ESD current to flow through it so as to maintain a fixed voltage level ($V_{clamp1}$) between pseudo first power supply ($V_{DD}$) line 318 and pseudo second power supply ($V_{SS}$) line 319. As a result, the voltage on pseudo second power supply ($V_{SS}$) line 319 increases so that the potential between pseudo first power supply ($V_{DD}$) line 318 and pseudo second power supply ($V_{SS}$) line 319 stay at the fixed voltage level ($V_{clamp1}$) set by first ESD clamping circuit 312. As the voltage on pseudo second power supply ($V_{SS}$) line 319 raises, diode 315 is placed in forward biased region and becomes conduct. Consequently, the voltage on actual second power supply ($V_{SS}$) line 322 increases. The relatively grounded second power supply ($V_{SS}$) pin causes the forward biased current of diode 315 to be drawn to actual second power supply ($V_{SS}$) line 322 and then to second power supply ($V_{SS}$) pin 105. As such, a second fixed voltage level ($V_{clamp2}$) between second ESD clamping circuit does not change. Therefore, diode 316 remains OFF. Since voltage at the anode terminal of diode 317 is lower than the voltage at the cathode terminal, diode 317 is also OFF. Thus, when a positive ESD event occurs at signal bus pad 106, ESD protection circuit 300 provides discharge path PS from diode 310, first ESD clamping circuit 312, diode 315, and then to actual second power supply ($V_{SS}$) pin 105.

Continuing with FIG. 5, during the normal operation of IC 100 when a voltage higher than actual first power supply ($V_{DD}$) pin 104 is applied to signal bus pad 106, the over-voltage at the anode terminal of diode 314 is not sufficient to cause diode 314 to conduct. As a result, diode 314 is not ON so that diode 314 seals off actual first power supply line ($V_{DD}$) 321 from the over-voltage. Thus, the normal operation of internal circuit 103 is not affected by the over-voltage at signal bus pad 106.

Now referring to FIG. 6, when a negative ESD stress is applied to signal bus pad 106 with second power supply ($V_{SS}$) 105 pin relatively grounded, diode 311 is ON and diode 310 is OFF. Diode 311, in forward biased region, causes current to flow from signal bus pad 106 to pseudo second power supply ($V_{SS}$) line 319. Thus, the voltage on pseudo second power supply ($V_{SS}$) line 319 becomes more negative, enlarging the voltage gap between pseudo second power supply ($V_{SS}$) line 319 and pseudo first power supply ($V_{DD}$) line 318. In response, first ESD clamping circuit 312 discharges to maintain the fixed clamping voltage ($V_{clamp1}$) between pseudo first power supply ($V_{DD}$) line 318 and pseudo second power supply ($V_{SS}$) line 319. At the same time, diode 315 is OFF because the negative voltage is present on pseudo second power supply ($V_{SS}$) 319 at its anode terminal. Similarly, diode 316 is also OFF. First ESD clamping circuit 312 discharges, causing voltage on pseudo first power supply ($V_{DD}$) line 318 to drop. As such diode 317 and diode 314 are ON. Negative ESD current flows from pseudo first power supply ($V_{DD}$) line 318 to actual second power supply ($V_{SS}$) line 322 via diode 317. Thus, ESD protection circuit 300 causes negative ESD current to flow through diode 311, first ESD clamping circuit 312, diode 317, actual second power supply ($V_{SS}$) line 322, and to second power supply ($V_{SS}$) pin 105. This path is labeled as path NS.

Continuing with FIG. 6, during the normal operation of IC 100 when a negative voltage lower than actual second power supply ($V_{SS}$) pin 105 is applied at signal bus pad 106, the over-voltage at the anode terminal of diode 315 is not sufficient to cause diode 315 to conduct so that actual second power supply line ($V_{SS}$) 322 is sealed off from the over-voltage. Therefore, negative over-voltage at signal bus pad 106 does not interfere with the normal operation of internal circuit 103.

Figure 7:
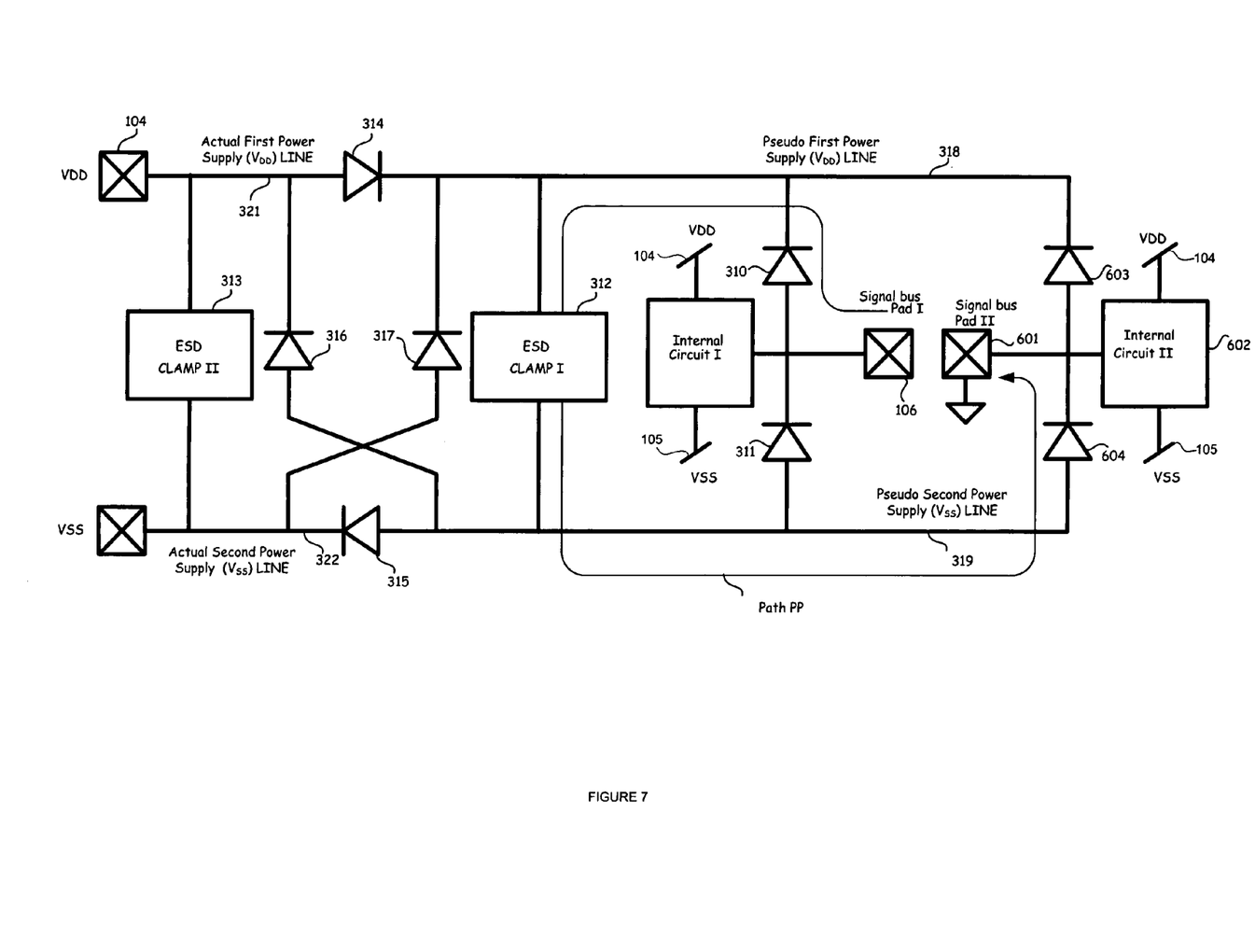
FIG. 7 shows an electrostatic discharge circuit that is electrically coupled to two signal bus pads, and illustrates a current discharge path when a positive ESD pulse is applied to one signal bus pad with the other signal bus pad relatively grounded in accordance with an embodiment of the present invention.
Figure 8:
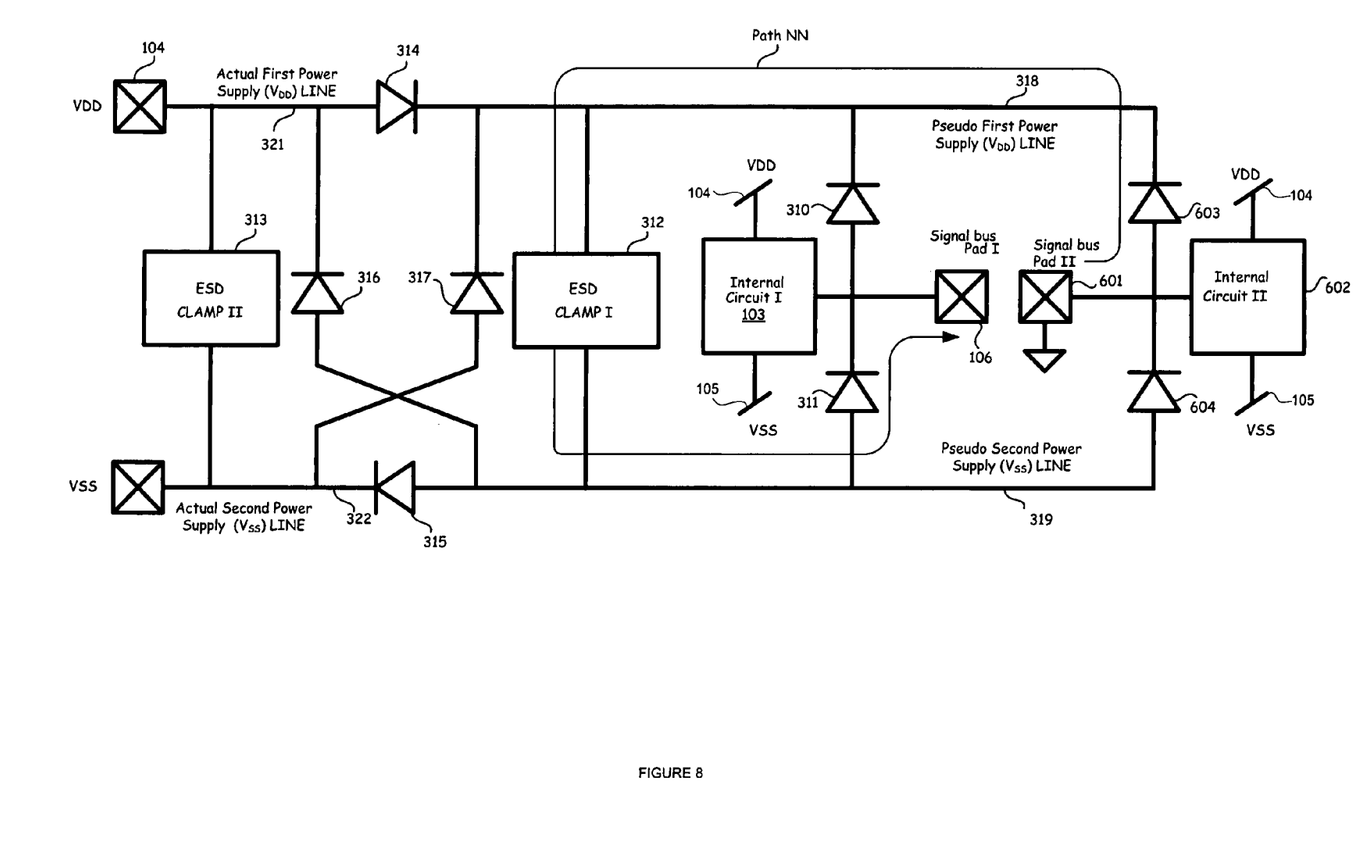
FIG. 8 shows the electrostatic discharge circuit of FIG. 7, and illustrates a current discharge path when a negative ESD pulse is applied to one signal bus pad with the other signal bus pad relatively grounded in accordance with an embodiment of the present invention.

FIGS. 7 and 8 show an integrated circuit that includes a signal bus pad 601 that is electrically coupled to a second internal circuit, shown as internal circuit 602. In this embodiment the ESD protection structure includes diode 603 that is connected in series between signal bus pad 601 and pseudo first power supply ($V_{DD}$) line 318. That is, the anode terminal of diode 603 is connected to signal bus pad 601, and the cathode terminal of diode 603 is electrically connected to pseudo first power supply ($V_{DD}$) line 318. The ESD protection structure also includes diode 603 that is connected in series between signal bus pad 601 and pseudo second power supply ($V_{SS}$) line 319. That is, the cathode terminal of diode 311 is electrically connected to signal bus pad 603 and the anode terminal is electrically connected to pseudo second power supply ($V_{SS}$) line 319.

When second signal bus pad 602 is relatively grounded and a positive ESD pulse is applied to first signal bus pad 106, the positive ESD pulse raises the voltage at signal bus pad 106 to a very high ESD voltage. High voltage at the anode terminal of diode 310 turns ON diode 310. On the other hand, diode 311 is OFF because the ESD voltage is placed at its cathode terminal. The forward biased diode 310 causes current to flow through it and as a result the voltage on pseudo first power supply ($V_{DD}$) line 318 becomes high, increasing the voltage gap between pseudo first power supply ($V_{DD}$) line 318 and pseudo second power supply ($V_{SS}$) line 319. In response, first electrostatic discharge (ESD) clamping circuit 312 causes ESD current to flow through it so as to maintain the voltage gap between pseudo first power supply ($V_{DD}$) line 318 and pseudo second power supply ($V_{SS}$) line 319 at the fixed voltage ($V_{clamp1}$). As a result, the voltage on pseudo second power supply ($V_{SS}$) line 319 increases so that the potential between pseudo first power supply ($V_{DD}$) line 318 and pseudo second power supply ($V_{SS}$) line 319 stay at the clamped voltage ($V_{clamp1}$) set by first ESD clamping circuit 312. As the voltage on pseudo second power supply ($V_{SS}$) line 319 raises, diode 604 is placed in the forward biased region and becomes conductive. The relatively grounded second signal bus pad 601 causes the forward biased current of diode 604 to be drawn to second signal bus pad 601. Thus, in this situation, ESD protection circuit 300 provides a discharge path PP from diode 310, first ESD clamping circuit 312, diode 604, and then to second signal bus pad 601.

Continuing with FIG. 7, during the normal operation of integrated circuit 100 when a voltage higher than actual first power supply ($V_{DD}$) pin 104 is applied to signal bus pad 106, the over-voltage the over-voltage at the anode terminal of diode 314 is not sufficient to cause diode 314 to conduct. As a result, diode 314 is not ON, sealing off actual first power supply ($V_{DD}$) line 321 from the over-voltage. Thus, the normal operation of internal circuit 103 is not affected by the over-voltage at signal bus pad 106.

Though FIG. 7 shows two signal bus pads, it is appreciated that the integrated circuit device may include many bus pads, with each bus pad connected to a pseudo power line 318 and a pseudo second power line 319 in the same manner as bus pad 601 and diodes 603-604 in FIG. 7. More particularly a first additional diode (e.g., diode 603) is connected in series between each additional signal bus pad and pseudo first power supply ($V_{DD}$) line 318 and a second additional diode (e.g., diode 604) is connected in series between each additional signal bus pad and pseudo second power supply ($V_{SS}$) line 319.

Now referring to FIG. 8, when a negative ESD stress is applied to first signal bus pad 106 with second signal bus pad 602 relatively grounded, diode 311 is ON and diode 310 is OFF. Diode 311, in forward biased region, causes current to flow from signal bus pad 106 to pseudo second power supply ($V_{SS}$) line 319. Thus, the voltage on pseudo second power supply ($V_{SS}$) line 319 becomes more negative, enlarging the voltage gap between pseudo second power supply ($V_{SS}$) line 319 and pseudo first power supply ($V_{DD}$) line 318. In response, first ESD clamping circuit 312 discharges to maintain the constant clamp voltage ($V_{clamp1}$) between pseudo first power supply ($V_{DD}$) line 318 and pseudo second power supply ($V_{SS}$) line 319. More negative pseudo first power supply ($V_{DD}$) line 318 cause diode 603 to turn ON. ESD current flows from first ESD clamping circuit 312 to pseudo first power supply ($V_{DD}$) line 318 to second signal bus pad 601 via forward biased diode 603. Thus, ESD protection circuit 300 causes negative ESD current to flow through diode 311, first ESD clamping circuit 312, pseudo first power supply ($V_{DD}$) line 318, diode 603, and to second signal bus pad 603. This path is labeled as path NN.

Continuing with FIG. 8, during the normal operation of IC 100 when a negative voltage lower than actual second power supply ($V_{SS}$) pin 105 is applied at signal bus pad 106, the over-voltage at the anode terminal of diode 314 is not sufficient to cause diode 314 to conduct. As a result, diode 314 is not ON, sealing off actual second power supply ($V_{SS}$) line 322 from the over-voltage. Therefore, negative over-voltage at signal bus pad 106 does not interfere with the normal operation of internal circuit 103.

In one embodiment the integrated circuit 100 includes a signal bus that operates at an over-voltage level. More particularly, some or all of the signals transmitted over signal bus pads 106 and 601 have a voltage that is within the over-voltage range. In this embodiment, the ESD protection circuit protects internal circuits from ESD events, and does not discharge when over-voltage is received at a signal bus pad.

Although specific embodiments of the invention have been disclosed, it will be understood by those having ordinary skill in the art that changes can be made to the specific embodiments without departing from the spirit and scope of the invention. Additionally, many modifications may be made to adapt a particular situation to the teachings of the present invention without departing from the central inventive concepts described herein. Furthermore, an embodiment of the present invention may not include all of the features described above. The scope of the invention is not to be restricted, therefore, to the specific embodiments, and it is intended that the appended claims cover any and all such applications, modifications, and embodiments within the scope of the present invention.

What is claimed is:

1. An ESD protection circuit for an integrated circuit, comprising:
    a diode circuit electrically coupled to a signal bus pad and an internal circuit of said integrated circuit;
    a pseudo power supply circuit electrically coupled to said diode circuit, said pseudo power supply circuit including a pseudo first power supply line that is electrically coupled to an actual first power supply line having a first voltage supply level such that said first pseudo power supply line receives said first voltage supply level from said actual first power supply line and a pseudo second power supply line that is electrically coupled to an actual second power supply line having a second voltage supply level such that said pseudo second power supply line receives said second voltage supply level from said actual second power supply line, said pseudo first power supply line and said pseudo second power supply line clamped by an ESD clamping circuit at a third voltage level, wherein said pseudo power supply circuit is operable, upon an occurrence of an ESD event at the signal bus pad to cause said diode circuit to conduct and to provide a discharge path, and wherein said pseudo power supply circuit is operable, upon an occurrence of an over-voltage event at the signal bus pad, to prevent said diode circuit from conducting, wherein said over-voltage event occurs when the voltage at the signal bus pad either exceeds the first voltage supply level or is lower than the second voltage supply level, but is still within a normal operating voltage range of the integrated circuit.

2. The ESD protection circuit of claim 1 wherein said diode circuit further includes:
    a first diode having an anode electrically coupled to said signal bus pad and a cathode electrically coupled to said pseudo first power supply line; and
    a second diode having a cathode electrically coupled to said signal bus pad and an anode electrically coupled to said pseudo second power supply line.

3. The ESD protection circuit of claim 2 wherein said diode circuit further comprises:
    a third diode having a cathode electrically coupled to said pseudo first power supply line and an anode electrically coupled to said actual first power supply line; and
    a fourth diode having an anode electrically coupled to said pseudo second power supply line and a cathode electrically coupled to said actual second power supply line.

4. The ESD protection circuit of claim 3 wherein said diode circuit further comprises:
    a fifth diode having an anode electrically coupled to said pseudo second power supply line and a cathode coupled to said actual first power supply line; and
    a sixth diode having a cathode electrically coupled to said pseudo first power supply line and an anode coupled to said actual second power supply line.

5. The ESD protection circuit of claim 1 further comprising a power supply circuit electrically coupled to said diode circuit for providing said first voltage supply level and said second voltage supply level to said integrated circuit and to said pseudo power supply circuit.

6. The ESD protection circuit of claim 5 wherein said power supply circuit further comprises a first power supply line electrically coupled to receive said first voltage supply level from a first power supply pin, a second power supply line electrically coupled to receive said second voltage supply level from a second power supply pin, and a second ESD clamping circuit, said first power supply line and said second power supply line clamped by said second ESD clamping circuit at a fourth voltage level.

7. The ESD protection circuit of claim 1 wherein said signal bus pad is coupled to a signal bus that couples electrical signals, some of said electrical signals having a voltage that is greater than said first voltage supply level.

8. The ESD protection circuit of claim 1 further comprising a plurality of additional signal bus pads electrically connected to additional internal circuits, each of said additional signal bus pads electrically coupled to said pseudo first power supply line and said pseudo second power supply line.

9. The ESD protection circuit of claim 8 further comprising a plurality of additional first diodes and a plurality of additional second diodes, an additional first diode electrically coupled between each of said additional signal bus pads and said pseudo first power supply line, and an additional second diode electrically coupled between each of said additional signal bus pads and said pseudo second power supply line.

10. An ESD protection circuit, comprising:
    a discharge means electrically coupled to a signal bus pad and an internal circuit of an integrated circuit;
    a trigger means electrically coupled to said discharge means, said trigger means including a pseudo first power supply line that is electrically coupled to an actual first power supply line having a first voltage supply level such that said first pseudo power supply line receives said first voltage supply level from said actual first power supply line and a pseudo second power supply line that is electrically coupled to an actual second power supply line having a second voltage supply level such that said pseudo second power supply line receives said second voltage supply level from said actual second power supply line, said trigger means for causing said discharge means to discharge ESD current when an ESD event occurs at said signal bus pad and for preventing said discharge means from discharging when an over-voltage event occurs at said signal bus pad, wherein said over-voltage event occurs when the voltage at the signal bus pad either exceeds the first voltage supply level or is lower than the second voltage supply level, but is still within a normal operating voltage range of the integrated circuit.

11. The ESD protection circuit of claim 10 further comprises a power supply means electrically coupled to said trigger means for providing said first voltage supply level and said second voltage supply level to said trigger means and said internal circuit.

12. The ESD protection circuit of claim 11 wherein said trigger means further comprises a pseudo first power supply means, a pseudo second power supply means, and an ESD clamping circuit electrically coupled between said pseudo first power supply means and said pseudo second power supply means to clamp said pseudo first power supply means and said pseudo second power supply means to a third voltage level.

13. The ESD protection circuit of claim 12 wherein said trigger means further comprises a first diode means coupled between said signal bus pad and said pseudo first power supply means, a second diode means coupled between said signal bus pad and said pseudo second power supply means, third diode means coupled between said pseudo first power supply means and said actual first power supply line, and a fourth diode means electrically coupled between said pseudo second power supply means and said actual second power supply line.

14. The ESD protection circuit of claim 12 wherein said trigger means further comprises a fifth diode means electrically coupled between said pseudo second power supply means and said actual first power supply line, and a sixth diode means electrically coupled between said pseudo first power supply means and said actual second power supply line.

15. An ESD protection circuit for an integrated circuit, comprising:
- a first diode having an anode terminal and a cathode terminal, said anode terminal electrically coupled in series to a signal bus pad;
- a second diode having an anode terminal and a cathode terminal, said cathode terminal electrically coupled in series to said signal bus pad;
- a pseudo first power supply line electrically coupled to the cathode terminal of said first diode;
- a pseudo second power supply line electrically coupled to the anode terminal of said second diode;
- a third diode having an anode terminal and a cathode terminal, said cathode terminal electrically coupled to said pseudo first power supply line and said anode terminal electrically coupled to an actual first power supply line, the actual first power supply line having a first voltage supply level;
- a fourth diode having an anode terminal and a cathode terminal, said anode terminal electrically coupled to said pseudo second power supply line and said cathode terminal electrically coupled to an actual second power supply line, the actual second power supply line having a second voltage supply level;
- a fifth diode having an anode terminal electrically coupled to said pseudo second power supply line and a cathode terminal electrically coupled to said actual first power supply line;
- a sixth diode having a cathode terminal electrically coupled to said pseudo first power supply line and an anode terminal electrically coupled to said actual second power supply line;
- a first ESD clamp circuit electrically coupled between said pseudo first power supply line and said pseudo second power supply line;
- a second ESD clamp circuit electrically coupled between said actual first power supply line and said actual second power supply line; and
- wherein, upon an occurrence of an ESD event, one or more of said first diode, said second diode, said third diode, said fourth diode, said fifth diode and said sixth diode conduct for providing a discharge path, and wherein a discharge path is not provided upon an occurrence of an over-voltage event wherein said over-voltage event occurs when the voltage at the signal bus pad either exceeds the first voltage supply level or is lower than the second voltage supply level, but is still within a normal operating voltage range of the integrated circuit.

16. The ESD protection circuit of claim 15 wherein said pseudo first power supply line and said pseudo second power supply line clamped by said first ESD clamping circuit at a third voltage level, said actual first power supply line and said second actual second power supply line clamped by said second ESD clamping circuit at a fourth voltage level.

17. The ESD protection circuit of claim 15 further comprising a plurality of additional signal bus pads, additional first diodes and additional second diodes, and wherein one of said additional first diodes is electrically coupled between each of said additional signal bus pads and said pseudo first power supply line, and one of said additional second diodes is electrically coupled between each of said additional signal bus pads and said pseudo second power supply line.

* * * * *